UNITED STATES PATENT OFFICE.

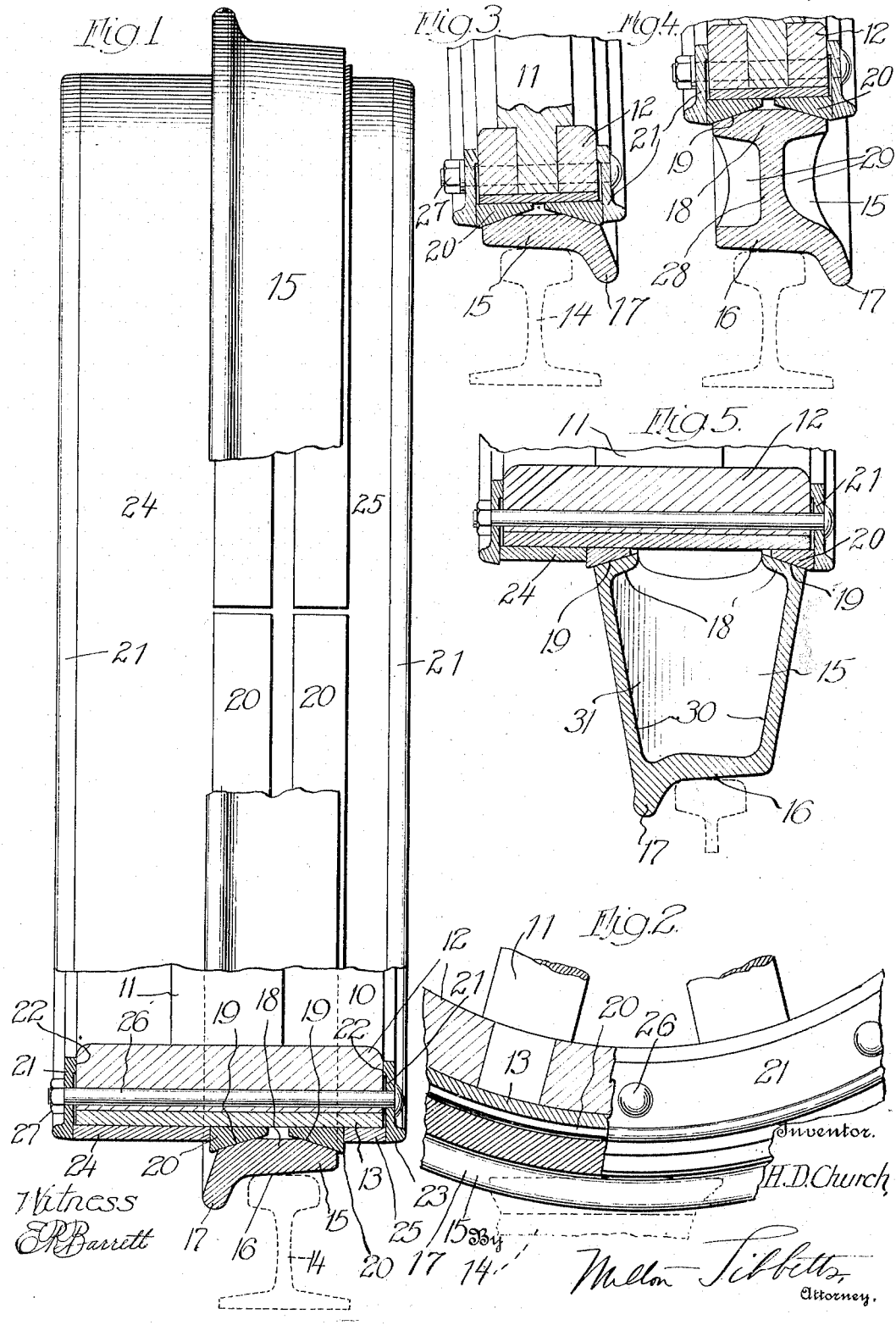

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,321,808. Specification of Letters Patent. Patented Nov. 18, 1919.

Application filed May 29, 1916. Serial No. 100,595.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the wheels thereof.

It is well known that the standard tread or distance between the wheels of the greater number of motor vehicles of today is approximately the same as the standard tread or gage of most of our railways, and it would be possible therefore to run a motor vehicle on a railway track by providing suitable flanged tires for the wheels. The present invention provides such tires which may be termed track adapters and embodies a construction in which such adapters may be mounted on the wheels of a vehicle so that they will be rigid, secure, safe and, if desired, easily and quickly detached and replaced with the regular standard tire equipment for road work. The salient object of the invention is to provide a track adapter of the above kind so that such motor vehicles may be run on a railway track as well as on roads.

Another object of the invention is to provide a track adapter that will increase the size of the wheel tread over that of the regular tire equipment of a particular vehicle, so that the speed of the vehicle may be increased relatively to the speed of its motor without changing the gear ratio.

Other objects of the invention will appear from the following description taken in connection with the drawings which form a part of this specification, and in which:

Figure 1 is a transverse sectional view and part elevation of a vehicle wheel embodying this invention;

Fig. 2 is a side elevation and part section of a segment of the wheel shown in Fig. 1; and Figs. 3, 4, and 5 are transverse sectional views of several different forms of the invention.

In the illustrative form of the invention herein shown a track adapter is applied to the front and rear wheels of a large commercial vehicle or truck, in which a single rubber tire is used on the front wheels and a double tire or dual tread tire is used on each of the rear wheels.

Referring to the drawings, Fig. 1 represents one of the rear or driving wheels of a commercial motor vehicle upon which the standard type of dual rubber tires may be used. The wheel is represented generally at 10 and comprises the spokes 11 and the felly 12. The felly is usually of wood with a steel band 13 surrounding it.

A railway track is represented in dotted lines by the rail or track 14 and an annulus or track adapter is shown as resting on the rail 14 and arranged between the rail and the felly 12 of the wheel. Preferably this track adapter or annulus 15 is a single continuous integral piece. As shown in said Fig. 1, it comprises a main or tread portion 16 and a flange 17 at one side thereof, the tread resting on the rail 14 and the flange 17 performing the usual function of retaining the tread on the rail.

It will be seen that the track adapter 15 is spaced somewhat from the periphery of the felly 12, and its base portion or inner periphery 18 is shown as beveled somewhat outwardly and toward each edge as at 19. Wedge shaped split rings 20 are arranged between the beveled portions 19 of the annulus and the outer periphery of the felly 12, and it will be understood that by clamping these rings 20 toward each other the annulus 15 will be rigidly, firmly, and concentrically secured on the felly of the vehicle wheel. Means for so clamping the rings 20 are provided in the form of flat clamping rings 21, which have their inner edges turned slightly as at 22, so that said edges only bear against the sides of the felly 12. The outer edges of these rings 21 are reinforced as at 23 and are adapted to press the wedge shaped rings 20 toward each other. Spacing rings 24 and 25 surround the periphery of the felly 12, and are arranged between the said wedge shaped rings 20 and the outer edges of the clamping rings 21, as will be clearly seen in Fig. 1. These spacing rings are adapted to properly position the track adapter laterally on the wheel felly, so that the tread of the wheel or track adapters may correspond to the gage of the railway track. This accounts of course for the ring 24 being so much wider than the ring 25 shown in Fig. 1, and it will be understood that by changing the relative widths of these rings the track adapter 15 may be shifted laterally on the vehicle wheel.

A series of bolts 26 pass laterally through the felly 12 and through the clamping rings 21, and nuts 27 on the ends of these bolts tighten the clamping rings so that the wedge rings 20 are forced toward each other to secure the annulus 15 on the felly in proper position.

Of course it will be understood that the track adapter may be readily removed by taking off the nuts 27, withdrawing one of the clamping rings 21, and one of the spacing rings 24, and a wedge ring 20. The track adapter may then be slipped off of the other wedge ring and off of the wheel felly. The reverse operation puts the track adapter back on the wheel so that it is rigidly and safely secured thereon.

In Fig. 3 a track adapter 15, similar to the one shown in Figs. 1 and 2, is illustrated as applied to the front non-driving wheel of a motor vehicle and it will be seen that the only difference between the two structures is that the spacing rings 24 and 25 are omitted.

Because of the comparative smoothness of the railway track over that of the ordinary road bed over which motor vehicles usually run, it is sometimes desirable, in adapting a vehicle to run on a railway track, to arrange the gear ratio between the motor and the wheels so that the vehicle may run faster on the railway track than it is adapted to run on ordinary roads. This may of course be done by changing the gear ratio between the motor and the driving wheels of the vehicle, but this change is very difficult to make quickly as it involves a complete substitution of gears. By the use of the form of track adapter shown in Figs. 4 and 5, the relative speed of the motor and vehicle may be changed without the substitution of gears. In said figures the tread of the wheel is enlarged considerably over its regular road equipment, and of course with a greater diameter wheel the vehicle will travel farther at each revolution.

In Fig. 4 the track adapter 15 is shown as applied to a front wheel or at least a narrow felly of a vehicle wheel, which may of course be a driving wheel if desired, and in Fig. 5 the track adapter is shown applied to one of the wheels having a broad felly.

Referring to Fig. 4, it will be seen that the track adapter or annulus 15, which is preferably a one-piece annulus, is of I-beam cross section, comprising a base portion 18, a tread portion 16, a flange portion 17, and a connecting portion 28, which is arranged radially in the form of a web between the base portion 18 and the tread portion 16. A series of cross webs 29 may be used to strengthen the annulus. As in the form shown in Fig. 1, the base portion 18 has tapered faces 19, and the annulus is secured to the wheel felly 12 in the same way as shown in connection with Figs. 1 and 2.

In Fig. 5 the annulus or track adapter 15 is of hollow construction. It may be said to be U-shaped in cross section, and it comprises the base portion 18, the tread portion 16, and flange portion 17. The connecting portion between the base and tread is in the form of separated webs 30, and a series of cross webs 31 may also be used. The inner edges of the webs 30 which form the base 18 of the annulus are beveled at 19 like the track adapters shown in the other figures. Also this track adapter is detachably secured on the wheel felly in the same manner as in the other forms of the invention.

It will be understood that other forms of the invention may be made without departing from the spirit or scope of the claims.

Having thus described my invention, what I claim and desire to secure by Letters Patent is:

1. The combination with a vehicle wheel having a felly, of a track adapter annulus comprising a tread portion and a flange portion, the inner face of said annulus being beveled toward both edges, wedge shaped split rings arranged between the felly and said annulus and adapted when pressed toward each other to wedge the annulus on the felly, two spacing rings mounted on the peripheral surface of the felly, one on each side of the annulus and bearing against a wedge ring, clamping rings bearing against the spacing rings and the sides of the felly, and bolts for drawing the said clamp rings toward each other.

2. The combination with a vehicle wheel having a felly, of a rail adapter annulus therefor of U-shaped cross section in which the tread portion comprises the outer part of the U section and is formed of a rim-like ring relatively narrow with respect to the radial length of the annulus, said part having a flange thereon and means for securing the annulus to the felly.

3. The combination of a vehicle wheel having a felly, of a hollow substantially U-shaped annulus, comprising a flanged tread portion of rim-like formation relatively narrow with respect to the radial length of the annulus and spaced side webs of substantially the same thickness throughout, the outer ends of said side webs joining the opposite edges of the tread portion and their inner edges being beveled, and wedge rings between said inner edges and the felly.

4. The combination of a vehicle wheel having a felly, of a hollow substantially U-shaped annulus comprising a flanged rim-like tread portion relatively narrow with respect to the radial distance from the tread to the felly and side webs extending from the edges of the said tread portion and spaced apart between the felly and said rim-like tread and a series of strengthening cross webs, the inner edges of said side webs being beveled and wedge rings between said inner edges and the felly.

In testimony whereof I affix my signature.

HAROLD D. CHURCH.